(12) United States Patent
Wattenburg (10) Patent No.: US 6,668,373 B1
(45) Date of Patent: Dec. 23, 2003

(54) SYSTEM, APPARATUS AND METHOD FOR EXPANDING THE RANGE OF DECIMAL NUMBERS OF ANY LENGTH IN EXISTING DATA BASES AND COMPUTER PROGRAMS

(76) Inventor: Willard H. Wattenburg, 2335 Rubicon Ct., Walnut Creek, CA (US) 94598

( * ) Notice: Subject to any disclaimer, the term of this patent is extended or adjusted under 35 U.S.C. 154(b) by 0 days.

(21) Appl. No.: 09/448,029

(22) Filed: Nov. 23, 1999

Related U.S. Application Data (60) Provisional application No. 60/120,743, filed on Feb. 18, 1999, provisional application No. 60/111,659, filed on Dec. 10, 1998, and provisional application No. 60/109,573, filed on Nov. 23, 1998.

(51) Int. Cl.[7] .................................................. G06F 9/45
(52) U.S. Cl. ........................ 717/159; 717/140; 717/151; 701/101
(58) Field of Search ................................. 717/163, 140, 717/151, 159; 709/131, 331; 714/35; 710/260

(56) References Cited

U.S. PATENT DOCUMENTS

| | | | | |
|---|---|---|---|---|
| 5,193,180 A | * | 3/1993 | Hastings | |
| 5,335,344 A | * | 8/1994 | Hastings | 714/35 |
| 5,495,612 A | * | 2/1996 | Hirayama et al. | 709/331 |
| 5,535,329 A | * | 7/1996 | Hastings | 714/35 |
| 5,668,989 A | * | 9/1997 | Mao | 341/82 |
| 5,828,890 A | * | 10/1998 | Rehbock et al. | 707/1 |

OTHER PUBLICATIONS

The Year 2000 and 2–Digit Dates: A Guide for Planning and Implementation, 6th Ed.; Pub No.: GC28–1251–05; International Business Machines Corporation; Dec., 1996.*

\* cited by examiner

*Primary Examiner*—Gregory Morse
*Assistant Examiner*—David A. Snyder
(74) *Attorney, Agent, or Firm*—Dorsey & Whitney LLP (57) ABSTRACT

A system, apparatus and method for modifying the machine code of an existing computer program to use a hybrid base-ten number system and corresponding hybrid arithmetic that replaces and processes all decimal numbers of any length. The hybrid base-ten arithmetic expands the numerical range of decimal numbers by expressing computed results in the hybrid base-ten number system. In some embodiments, the corresponding hybrid arithmetic rules recognize some number combinations as non-numerical special codes.

7 Claims, 6 Drawing Sheets

SYSTEM, APPARATUS AND METHOD FOR EXPANDING THE RANGE OF DECIMAL NUMBERS OF ANY LENGTH IN EXISTING DATA BASES AND COMPUTER PROGRAMS

CROSS REFERENCE TO RELATED APPLICATIONS

The application claims priority to U.S. provisional application Serial No. 60/109,573 filed Nov. 23, 1998, U.S. provisional application Serial No. 60/111,659 filed Dec. 10, 1998 and U.S. provisional application Serial No. 60/120,743 filed Feb. 18, 1999.

FIELD OF THE INVENTION

The present invention relates generally to the use of a hybrid base-ten number system to expand the numerical range of all decimal numbers and more particularly to the year 2000 problem (Y2K). More particularly, the present invention relates to a system, apparatus, and method which uses a hybrid base-ten number system and arithmetic to replace all decimal arithmetic operations and standard base-ten numbers of any length in the machine code of an existing computer program and its databases, such that the existing computer program, when executed, correctly processes two-digit year dates beyond 1999.

BACKGROUND OF THE INVENTION

Modem-day computers and telecommunication equipment almost universally represent each of the 10 decimal digits (0–9) as a 4-bit binary code. There are many situations in which it is desirable to expand the range of decimal numbers of fixed length, such as, for example, the two-digit year date numbers used in computer programs that suffer the Y2K problem, the seven-digit local telephone numbers, and nine-digit Social Security numbers. With respect to the Y2K problem, as the millennium approaches, information technology departments are faced with a significant problem of ensuring that software programs that process year dates from 1900 to 2000 and beyond function correctly. This problem, commonly referred to as the year 2000 problem, or Y2K, lies in the fact that most four digit year dates are typically represented in by a computer program as two-digits, with the first two-digits of the four-digit year date assumed to be "19". This two-digit year date representation was also typically adopted by programmers when designing user interfaces that displayed year dates, and when storing four-digit year dates in, for example, databases records, and/or data files.

The classical Y2K problem in computer programs stems from the fact that the largest magnitude decimal number that can be represented with two decimal digits is 99. An arithmetic operation on such a year date that involves a carry of 10 to a third digit position will be incorrectly represented by two-digits. To illustrate this, consider that 99+5=104 involves a carry of 10 to a third digit. A computer program, data file, or a database record that retains only the low-order two-digits of the three-digit result as a two-digit year date, will retain an incorrect year date of 04.

Other arithmetic operations, such as, for example subtraction operations may produce erroneous results of the first two-digits of a four-digit year date are assumed to be "19". For example, to determine how old a person born on 12/31/90 (Dec. 31, 1990) would be on 12/31/10 (Dec. 31, 2010), 12/31/90 is typically subtracted from 12/31/10. In particular, year date "90" is subtracted from year date "10". It can be seen that such an operation on the two two-digit year date representations does not produce the correct result of 20 years old, but rather an incorrect result of −80 years old.

During the last few years, programmers have faced a monumental task of trying to solve the Y2K problem. Solutions to the Y2K problem typically involve either moving the 100-year span represented by two decimal digits forward to cover some years in the 2000 century, or re-programming existing computer software source code that processes two-digit year dates to use four-digit year dates.

Moving the 100-year span forward is called "date windowing." Date windowing uses the existing two digit year fields along with additional computer program logic to determine the century, then corrects dates related logic based on a derived century field. This method is limited in that it only works when the dates within an application or a program fall within a 100-year range. Therefore, windowing solution is only a temporary solution and many "windowed" computer programs will have to be reprogrammed in the future to expand the range of years beyond the 100-year range.

The majority of Y2K repair (remediation) work has been done by enormously expensive manual re-programming of computer programs that were written in a programming language such as, for example, COBOL, Fortran, and the like. It can be appreciated that adopting such an approach typically involves redesigning any associated user interfaces, databases, records, and/or data files that use the restricted two-digit year date format.

Often such source code is not even available, and only compiled source code, in the form of machine code is available. Machine code is different from high-level source code or assembly language in that machine code is a numeric version of the computer instructions and data (also known as a binary executable image or run-time program) of a computer program. The programming industry has all but abandoned most run-time computer programs for which there are no source code descriptions available. The common belief is that it is hopeless to unscramble the program logic of these orphan machine code computer programs, because machine code is very difficult for human beings to decipher. There are countless of these orphan machine code computer programs around the world, and many may have to be replaced at an enormous expense.

Number systems that can represent more than 100 year dates with two-digits that will fit into the eight binary bits are known in the art. However, not one of these known numbering schemes has been able to eliminate the need for substantial manual reprogramming of existing computer program source codes to make such computer programs year 2000 compliant. This is because, to use such known numbering schemes, each place in a computer program, and any associated database where a two-digit year date is respectively generated, processed, and/or stored, typically must be manually located so that each two-digit year date can be replaced with a new year 2000 compliant two-digit year date. This is particularly evident when a two-digit year date is embedded in a string of other integers (a larger integer), for example, when a two-digit year date is embedded in a credit card number, or embedded in an inventory part number.

For example, suppose that 67439382 is a part number having an embedded two-digit year date of "93" in the respective third and fourth digit positions. Desiring to add, for example, twelve (12) years to the embedded year date to achieve a year date of 2005, a computer program will typically add 1200 to the part number to increase the embedded year date by 12 years, resulting in a sum of 67440582. It can be seen that the addition operation results in a carry of $1*10^4$ to the fourth digit position. Thus, the two-digit year date "05" incorrectly appears in the third and fourth digit positions which represents year date 2005 as year date 1905.

An additional problem with the state-of-the-art stems from the fact that many existing computer programs typically reserve one or more special two-digit numerical codes to indicate a particular condition. For example, special code "99" year date is sometimes reserved to indicate to a computer program during a read data file operation, that an end-of-file condition has been reached. In yet another example, special code year date "00" is typically reserved by a computer program that processes two-digit year dates, to either indicate that no year date information is required in a particular data field, or to indicate that no year date information is available.

As a result, existing computer programs that use such special codes typically do not correctly process any two-digit year dates that are numerically equivalent to the special codes. Therefore, what is needed are a system, apparatus and method for correctly processing a two-digit year date representation that is numerically equivalent to a special code but does not use the same decimal digits used by existing computer programs for the special code.

What is needed is a solution to the Y2K problem that can: (1) modify two-digit decimal year date processing in the machine code of existing computer programs to expand the range beyond 1999 in a manner that does not require manual intervention by a human being to reprogram any source code (if available), or to locate all the places in a computer program and any associated databases where two-digit year dates are respectively generated, processed, or stored; (b) correctly process two-digit year dates that are embedded at any position in a string of other integers; and (c) correctly process two-digit year dates that are numerically equivalent to any special codes. Ideally, this Y2K solution could be applied to all computer programs, not just those computer programs with the available source codes.

SUMMARY OF THE INVENTION

In one aspect, a method replaces all decimal arithmetic operations in an existing computer program with a hybrid base-ten number system arithmetic called WF arithmetic which properly processes all decimal numbers and hybrid base-ten WF numbers and returns all computed results as range-expanded WF numbers (which include all decimal numbers). In the simplest version of the six upwardly compatible WF hybrid base-ten number systems (WFNS), the decimal digits 0, 1, 2, 3, 4, 5, 6, 7, 8, 9, and one additional digit "a" are used. The digit "a" has the value of decimal 10 when used as a multiplier of powers of ten in this WFNS. In this aspect, the range of numerical values expressed by any conventional decimal number can be expanded. Two-digit decimal numbers are expanded to a range of 0 to 110 when expressed in this WFNS.

The various WF number systems are redundant number systems in that most numerical quantities can be expressed by many different WF numbers. This redundancy has many applications in data processing, telecommunications, and data encryption. It provides easy solutions to many problems created by the limits of decimal numbers. Of specific application to the Y2K problem in computers, using this method and version of the WFNS, two-digit decimal numbers that represent year dates are automatically converted to two-digit WF numbers which have an expanded range of 0 to 110 (decimal equivalent) which can represent up to 110 years. The method does not need to know where decimal numbers, in particular two-digit decimal year dates, are stored or processed in an existing computer program. The method easily converts run-time (machine code) programs and does not need source programs. Five of the six "nested" WF number systems that can be used to solve the Y2K problem allow the use of certain non-numerical digit combinations that are recognized by the corresponding WF arithmetic.

In another aspect, the various WF arithmetic rules and functions are embodied in and executed by a system and apparatus that is a run-time computer program called CETA Patch. CETA Patch is connected to and then executed with an existing computer program such that the existing program logic is converted to use WF arithmetic operations in place of all decimal arithmetic operations specified in the existing program logic thereby solving Y2K for up to another 65 years. The original program logic is not changed (reprogrammed) in any other way in the converted run-time program. The system and method that performs the off-line conversion of existing computer programs by connecting CETA Patch to them is called CETA for "Conversion at Execution Time Arithmetic".

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF EMBODIMENTS OF THE INVENTION

The invention will now be described in detail by way of illustrations and examples for purposes of clarity and understanding. It will be readily apparent to those of ordinary skill in the art in light of the teachings of this invention that certain changes in modifications may be made thereto while remaining within the spirit or scope of the appended claims. Section headings are provided for convenience and are not to be construed as limiting the disclosure, as all various aspects of the invention are described in the several sections.

The invention disclosed herein is a system, apparatus, and method for converting the machine code of a wide variety of existing computer programs so that such a converted existing computer program has an expanded year-date range from 1900 up to and including 2065. This invention does not require manual reprogramming of either the source code or the machine code versions of the existing computer programs. This invention has been implemented into workable products for many popular computers in use today, in particular, this invention has been implemented and tested on the IBM PC, the IBM 390, and the AS400 class of computers.

A. A Novel Hybrid Base-Ten (10) Number System

The present invention uses a hybrid, redundant, number system, hereinafter often referred to as the Wattenburg Format ("WF") number system. The WF number system is a base b number system that uses more than b digits as multipliers of the successive powers of the base b. The WF number system uses a total of j digits, where j is greater than b. The digits $d(0), d(1), \ldots d(b-1)$ have the values 0 to (b−1) respectively. Some of the digits $d(i)$, i greater that (b−1), have numerical values greater that b.

In one embodiment, some of the digits $d(i)$, i greater than base b minus 1, may have no numerical value. Such digits are respectively called "flag digits." A flag digit in combination with other digits in a WF number may represent actual numeric quantities or represent special circumstances that are recognized during arithmetic operation on WF numbers. This embodiment is described in greater detail below in reference to FIG. 6.

All explanations and applications of the WF number system that follow use the base-ten (10) number system. All definitions, characteristics, and arithmetic rules for the base-ten WF number system that are discussed in greater detail below apply equally well to WF number systems of any base b. The appropriate generalization to any other base b can be easily recognized by anyone familiar with standard number systems.

The numerical value of a base-ten WF number is computed in the same way as the value of a decimal number. A base-ten WF number J having any number n of digits $d(i)$, wherein each digit $d(i)$ is a multiplier of a power of 10, is expressed as: $J=(d(n-1)\times 10^{n-1})+ \ldots +(d(2)\times 10^2)+(d(1)\times 10^1)+(d(0)\times 10^0)+(d(-1)\times 10^{-1})+(d(-2)\times 10^{-2}+ \ldots$.

The base-ten WF number system uses 11 to 16 digits as multipliers of successive powers of ten. Each digit d can have a numerical value that is represented by one, or possibly more than one (depending upon the range and redundancy desired for the number), of the following possible digits: 0, 1, 2, 3, 4, 5, 6, 7, 8, 9, a, b, c, d, e and f. Each respective digit 0–9 is a standard decimal digit. (That is, all decimal numbers are included in the WF number system). Digit "a" represents the decimal number 10, digit "b" represents the decimal number 11, digit "c" represents the decimal number 12, digit "d" represents the decimal number 13, digit "e" represents the decimal number 14, and, and digit "f" represents the decimal number 15.

To illustrate a WF hybrid base-ten number, consider that 2d6 is equal to decimal 336. In other words, 2d6 is equivalent to: $(2\times 10^2)+(13\times 10^1)+(6\times 10^0)$, which is equal to the decimal value of 336. It must be emphasized that decimal 336 is encompassed in the hybrid base-ten number system, and, as will be explained in greater detail below, 336 is a redundant variation of 2d6. In fact the entire conventional base-ten decimal number system, consisting of digits 0–9, is encompassed by the WF hybrid base-ten number system. Other WF numbers include, for example: the single digit "c", which is equal to decimal 12, and e5, which is equal to decimal 145.

There are six different forms of the WF number system. Each respective form is designated as a WF(r) number system, where r=10, 11, 12, 13, 14, 15, and 16. Each respective form is defined based on how many of the sixteen digits 0–9, and a through f are used in the respective WF(r) form. For example, a WF number system that uses the maximum 16 digits as numerical digits, is called a WF16 system. Any WF(r) number system that uses less than the maximum sixteen digits as numerical digits, is referred to as a truncated WF number system. (Hereinafter, the number r of a WF(r) number system is called the "rank" of the WF number system.)

A truncated WF number system can represent the following year-date ranges as two-digit numbers: (a) WF11 (00 to aa) can represent year dates 1900 to 2010; (b) WF12 (00 to bb) can represent year dates 1900 to 2021; (c) WF13 (00 to cc) can represent year dates 1900 to 2032; (d) WF14 (00 to dd) can represent year dates 1900 to 2043; and, (e) WF15 (00 to ee) can represent year dates 1900 to 2054.

WF numbers in any of the truncated WF number systems are upward compatible with higher WF number systems and the arithmetic appropriate for any higher WF number system. However, a truncated WF number system is not downward compatible with lower WF number systems and the arithmetic appropriate for any lower WF number system. To illustrate this, consider that any number in the WF11 system such as "2a5" has the same numerical value as 2a5 in the WF12, WF13, WF14, WF15 and WF16 number systems. Hence, WF12 arithmetic will properly process WF11 numbers. However, the results of WF12 arithmetic operations on WF11 numbers will not always be valid WF11 numbers since the WF12 numbers produced can use digits not allowed in the lower WF11 number system.

Two-digit WF15 numbers are of special importance because they are used by the present invention to replace the two-digit decimal year dates in computer programs with the Y2K problem. (The f=15 digit is used as a special non-numerical "flag digit" as explained later for the WF15 number system)

Note that each WF number of the form xy, where 0<x<=e and 0<=y<=4, has another redundant form that is numerically equal in value (<=means "less than or equal). The 225 two-digit WF15 numbers which represent 154 different numerical values are listed below:

00, 01, 02, 03, 04, 05, 06, 07, 08, 09,
10=0a, 11=0b, 12=0c, 13=0d, 14=0e, 15, 16, 17, 18, 19,
20=1a, 21=1b, 22=2c, 23=1d, 24=1e, 25, 26, 27, 28, 29,
30=2a, 31=2b, 32=2c, 33=2d, 34=2e, 35, 36, 37, 38, 39,
40=3a, 41=3b, 42=3c, 43=3d, 44=3e, 45, 46, 47, 48, 49,
50=4a, 51=4b, 52=4c, 53=4d, 54=4e, 55, 56, 57, 58, 59,

. (60, 70, 80 series here)
.

90=8a, 91=8b, 92=8c, 93=8d, 94=8e, 95, 96, 97, 98, 99,
a0=9a, a1=9b, a2=9c, a3=9d, a4=9e, a5, a6, a7, a8, a9,
b0=aa, b1=ab, b2=ac, b3=ad, b4=ae, b5, b6, b7, b8, b9,

. (c0,d0 series here)

e0=da, e1=db, e2=dc, e3=dd, e4=de, e5, e6, e7, e8, e9, ea, eb, ec, ed, ee.

Note that there are 14×5 or 70 redundant two-digit WF15 numbers of the form xy where 0<=x<=d and a<=y<=d (all the numbers after an = sign above, such as 0a, 9b, dd, etc.). These 70 redundant forms of two-digit WF15 numbers are called the "rn" numbers (for redundant numbers). The other 155 two-digit WF15 numbers are called the "nn" WF numbers (for normal numbers).

It is easy to recognize the redundant "rn" numbers because any two-digit WF15 number with a low-order digit of "a" through "e" is an m number unless its high-order digit is an "e." All the rest are "nn" numbers. The following examples demonstrate the redundancy that is possible in the WF15 number system: 63=5d, 91=8b, 134=d4=ce=12e, and 32345=322e5=31ce5=2bce5=2bd45=2c345=32345.

In these examples note the general rule that any digit position (except the highest digit position) in a WF15 number which contains a decimal digit of 0, 1, 2, 3, or 4 can be increased by 10 to a digit a, b, c, d, or e by borrowing 10 from the next higher digit position and decreasing that digit by 1 (e.g. the "4" in 134 goes to an "e" in 12e and the "2" in 12e goes to "c" in ce; 32345 goes to 322e5). Conversely, any digit position with a digit a, b, c, d, or e can be decreased by 10 by adding 1 to the next highest digit position (e.g. 8b=91, ce=d4, 2c345=33245).

The redundant number forms in the WF hybrid base-ten number system are essential for the invention described herein. The redundant numbers in the WF number system use digits a, b, c, d, e, or f (commonly called hex digits) in any digit position. The redundant numbers make it possible to represent decimal numbers of any length as numerically equivalent WF numbers and to develop a compatible and comprehensive WF arithmetic which properly processes all decimal numbers and WF numbers of any length and combinations thereof, as will be described later.

For instance, looking at just the two-digit WF15 numbers above, if the redundant forms (m) are excluded, what is left is a limited two-digit hybrid number system that can represent only decimal numbers from 00 to 149 (e9) because the low order digit of each hybrid number 00 to e9 can use only the decimal digits 0 through 9. Attempts have been made to use such limited non-redundant two-digit hybrid number systems to solve the Y2K problem. However, no comprehensive arithmetic can be developed which can properly process these two-digit hybrid numbers when they are embedded at arbitrary locations in larger decimal numbers of any length (the location of the two-digit hybrid number must be known in order to perform special hybrid arithmetic on it while using normal decimal arithmetic on the rest of the number).

An example will bring this unique feature of the WF hybrid number system and WF arithmetic into focus before proceeding to the detailed descriptions of the invention in all of its forms.

Consider a typical inventory part number stored in a computer data base that is processed by an existing computer program. The number is 5869640 where the third and fourth digits (96) are a two-digit decimal year date representing the manufacturing date. The program might add 0800 to this part number to add eight years to the year date 96 to indicate the shelf life (a very common sort of calculation). This creates a &2K problem because the result of 96+8=104 will be a three digit decimal quantity that sends a carry of 1 to the fifth digit 6 and leaves an erroneous year date of 04 in the year date field.

Now, perform the addition of 5869640+0800 by WF15 arithmetic using a rule called "retain highest WF digit possible in each digit position of the sum" (as formally defined later). The result will be 5869e40. The year date remains a two-digit WF15 number 9e (9e=104 which stands for 2004). There is no overflow and loss of year date information until the WF year date exceeds ee=154. The answer generated by WF15 arithmetic generated a redundant form of the two-digit year date by using the rule 6+8=14=e for the low order digit and 9+0=9 for the high order digit.

If the decimal arithmetic used by an existing program gives proper results until a computed year date exceeds 99, then WF arithmetic operating on the same numbers will give proper two-digit results until the numerical limit of two-digit WF numbers is exceeded (which is ee=154 for the WF15 number system).

B. System Level Description

Figure 1:
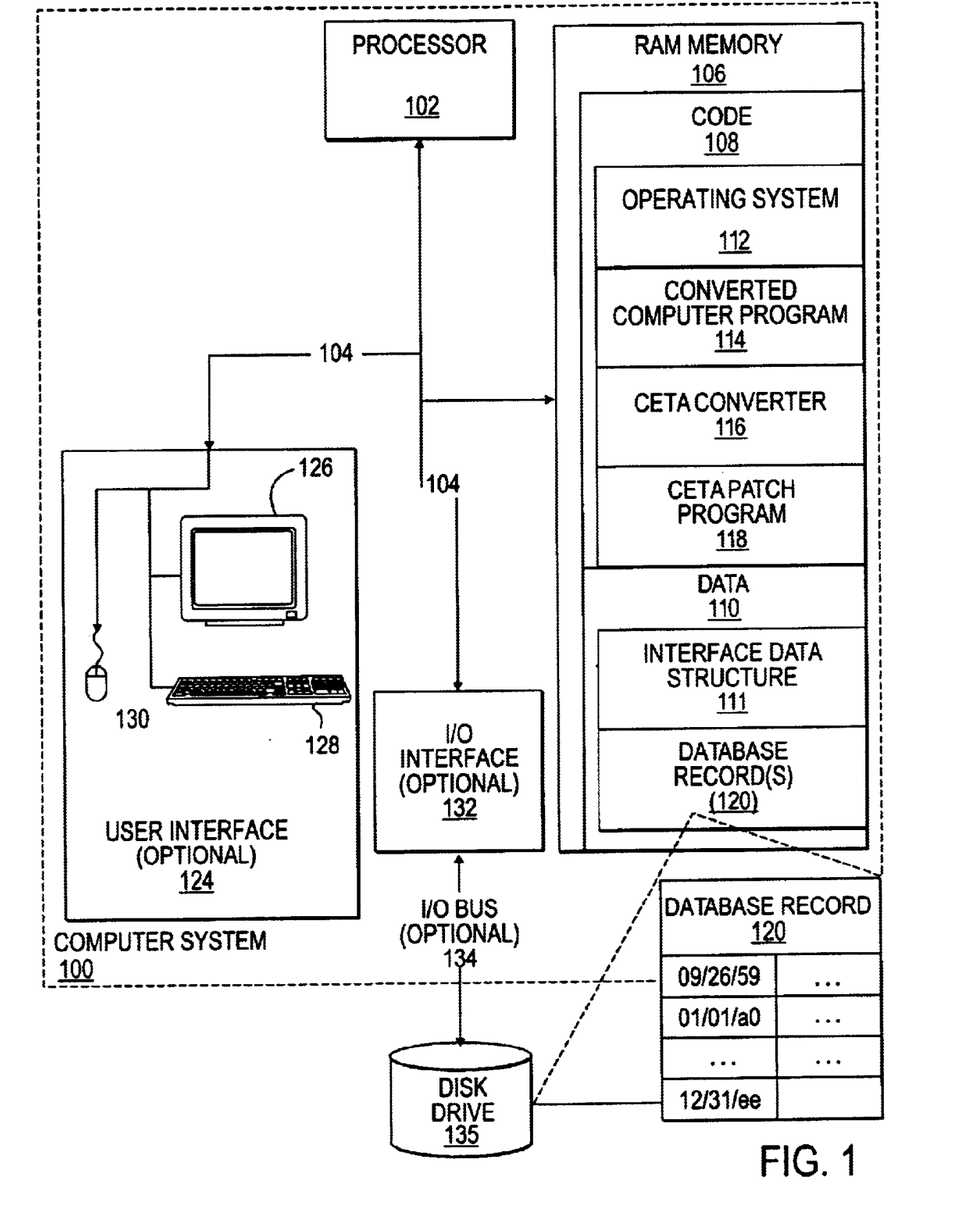
FIG. 1 is a block diagram illustrating aspects of an exemplary computer system, according to one embodiment of the present invention.

Referring to FIG. 1, there is shown a block diagram illustrating aspects of an exemplary computer system 100, according to one embodiment of the present invention. Computer system 100 includes a processor 102 coupled across an internal communication bus 104 to a random access memory (RAM) 106.

Processor 102 is used both to execute code 108 stored in RAM memory 106, and to store and retrieve data 110 respectively to and from RAM memory 106. Processor 102 is adapted to operate at a constant rate in discrete time intervals, called clock cycles. These clock cycles are used by the present invention to determine a system date or a current date.

Figure 2:
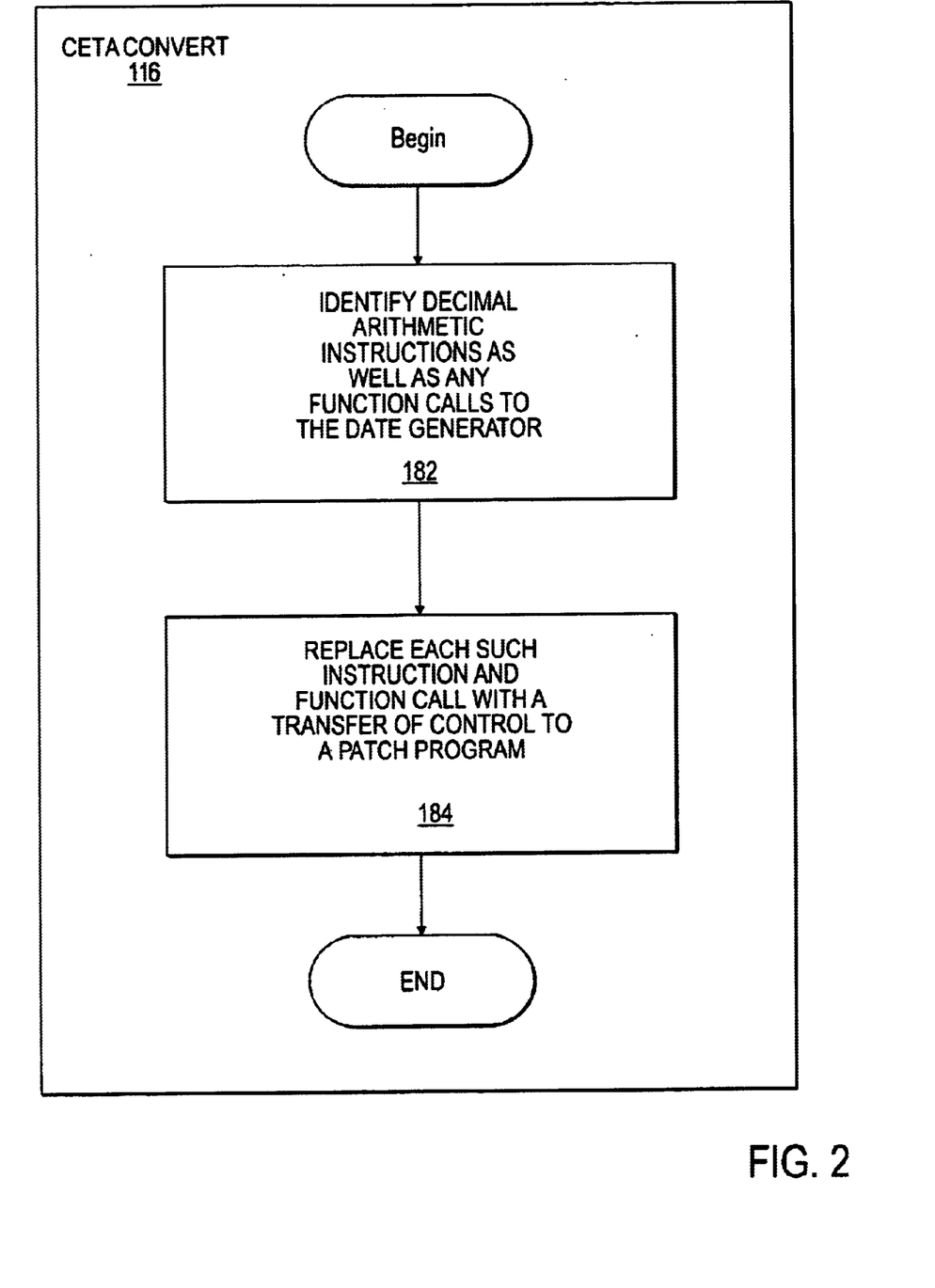
FIG. 2 is a flowchart illustrating aspects of an exemplary Conversion at Execution Time Arithmetic ("CETA") convert procedure, for enabling a computer program to process two-digit year dates from 1900 to 2065, according to one embodiment of the present invention.

Such code 108 includes, for example:
a. an operating system 112, for performing, for example, basic I/O functions, memory management functions, and for providing a computer program interface to determine a system date or a current date, for example, a system date or a current date interrupt routine;
b. a converted computer program 114 in machine code form that correctly processes two-digit year dates that extend beyond year date 1999 (converted computer program 114 is discussed in greater detail below in reference to FIGS. 2–6);
c. a Conversion At Execution Time Arithmetic ("CETA") Converter computer program 116, for converting an existing computer program, such that the converted computer program 114 will correctly process two-digit year dates that extend beyond year date 1999 (CETA Convert 116 is discussed in greater detail below in reference to FIG. 2);
and,
d. a CETA patch program 118, for both: (a) implementing one or more decimal arithmetic operations using the WF number system and arithmetic to correctly processes two-digit year dates that extend beyond year date 1999; and (b) returning a WF number from a function call to a system date generator (CETA patch program 118 is discussed in greater detail below in reference to FIG. 4).

Data 110 includes, for example, and interface data structure 111, and a database record 120. Interface data structure 111 is used by CETA patch program 118 to store certain information associated with executing a decimal arithmetic instruction or a function call to a system date or a current date generator. Interface data structure 111 is described in greater detail below in reference to FIG. 5.

Database record 120 is optional, and if present, database record 120 is used by the converted existing computer program 112 to store one or more two-digit year dates. For example, database record 120 includes dates of the format "MM/DD/YY, where "YY" represents a two-digit year date. In this example, for reasons discussed in greater detail above, "09/26/59" represents Sep. 26th, 1959, "01/01/a0", represents Jan. 1st, 2000, and "12/31/ee", represents Dec. 31 st, 2054. It can be appreciated that it is not necessary for such a date to include respective month or day of the month representations.

Optionally, internal communication bus 104 may be coupled to a user interface 124, for interfacing, by a human being, with the processor 102, to the operating system 112, computer programs 114–118, and data 110 stored in memory 106. Such a user interface 124 can include, for example, an input keyboard 128, a pointing device 130, and a display device 126, such as, for example a cathode ray tube (CRT) device.

Internal communication bus 104 may also be coupled across optional I/O Interface 132 to one or more non-volatile disk storage devices, such as, for example, disk drive 135 by means of, for example, optional I/O bus 134. It can be appreciated that disk drive 135 may contain one or more database records 120 having two-digit year dates stored therein.

C. CETA Converter 116

Referring to FIG. 2, there is shown a flowchart illustrating aspects of an exemplary CETA Converter 116 procedure, according to one embodiment of the present invention. As will be described in greater detail below the CETA Converter 116 procedure completely avoids any necessity of manually, by a human being, identifying areas in the machine code of an existing, pre-converted computer program (such an existing, pre-converted computer program is not shown) that process two-digit year dates from 00–99.

After such a conversion, the pre-converted computer program is referred to as converted computer program 114 as illustrated in FIG. 1. If the arithmetic logic in the pre-converted computer program correctly processed and stored two-digit decimal year dates from 00 to 99, then after executing CETA converter 116, the converted computer program 114 will properly process and store two-digit WF(r) year dates that extend beyond 1999. This is true no matter how any two-digit year dates may have been generated, processed, located or stored in the pre-converted computer program. This is because WF numbers will be generated and stored in place of decimal integers, and how a computer represents and stores numbers internally as binary digits is of no consequence, so long as the proper results are computed and presented to the external world. Exemplary steps of CETA 116 are now described.

At step 182, any decimal arithmetic instructions and/or function calls to a system date or current date generator in the machine code of computer program 114 are identified. Such decimal arithmetic instructions include, for example, add, subtract, multiply, divide, and compare. Machine code representations of each of the above arithmetic instructions, and function calls are known in the art.

In one embodiment that is implemented with respect to IBM 390 computer systems, such instructions also include, for example, shift, round, edit, mark, zero, and convert to binary. In this embodiment, any "pack" and MVC instructions are also identified, because they typically end a machine code instruction sequence that a compiler generates for system date function calls. Machine code representations of each of the above arithmetic instructions, and function calls are known in the art.

To identify such instructions and function calls, the machine code of the computer program 114 (see FIG. 1) is disassembled into a combination of opcodes and associated data. An opcode is a bit pattern that identifies a particular assembly language instruction. The binary bytes are examined, and any binary bytes that contain machine code instructions are interpreted according to the opcode value and instruction format of the opcode. In this manner, CETA Convert 116 identifies decimal instructions and instruction sequences as well as function calls to a system or current date generator.

In one embodiment, disassembly is accomplished by interpreting the binary bytes (extended binary coded decimal interchange code—EBCDIC) and identifying the semantic interpretations of the bytes as published in a number of IBM manuals.

At step 184, for each identified decimal arithmetic instruction (step 182) and function call to a system or current date generator, the respective instruction or function call is replaced with a transfer of control instruction to one or more patch programs 118 (see FIG. 1). Methods for replacing (or bypassing) such instructions and function calls are known in the art of computer programming. Additionally, such transfer of control instructions can be implemented, for example, with one or more assembly language instructions that are known in the art of computer programming.

We now describe an exemplary CETA Patch Program 118 procedure.

D. The Converted Computer Program 112 Referring to FIG. 3, there is shown a flowchart illustrating aspects of an exemplary computer program 114, for processing two-digit year dates from 1900 to 2065, according to one embodiment of the present invention. After CETA Convert 116 is applied to the machine code of the existing computer program 112, the computer program 114 is executed by the processor 102 (see FIG. 1). This is typically accomplished by, for example, a human being executing the computer program 114 from the user interface 124. However, it can be appreciated that there are other ways to execute a computer program 114, including, for example, instantiating computer program 114 in response to the expiration of a timer (not shown) internal to processor 102.

Figure 3:
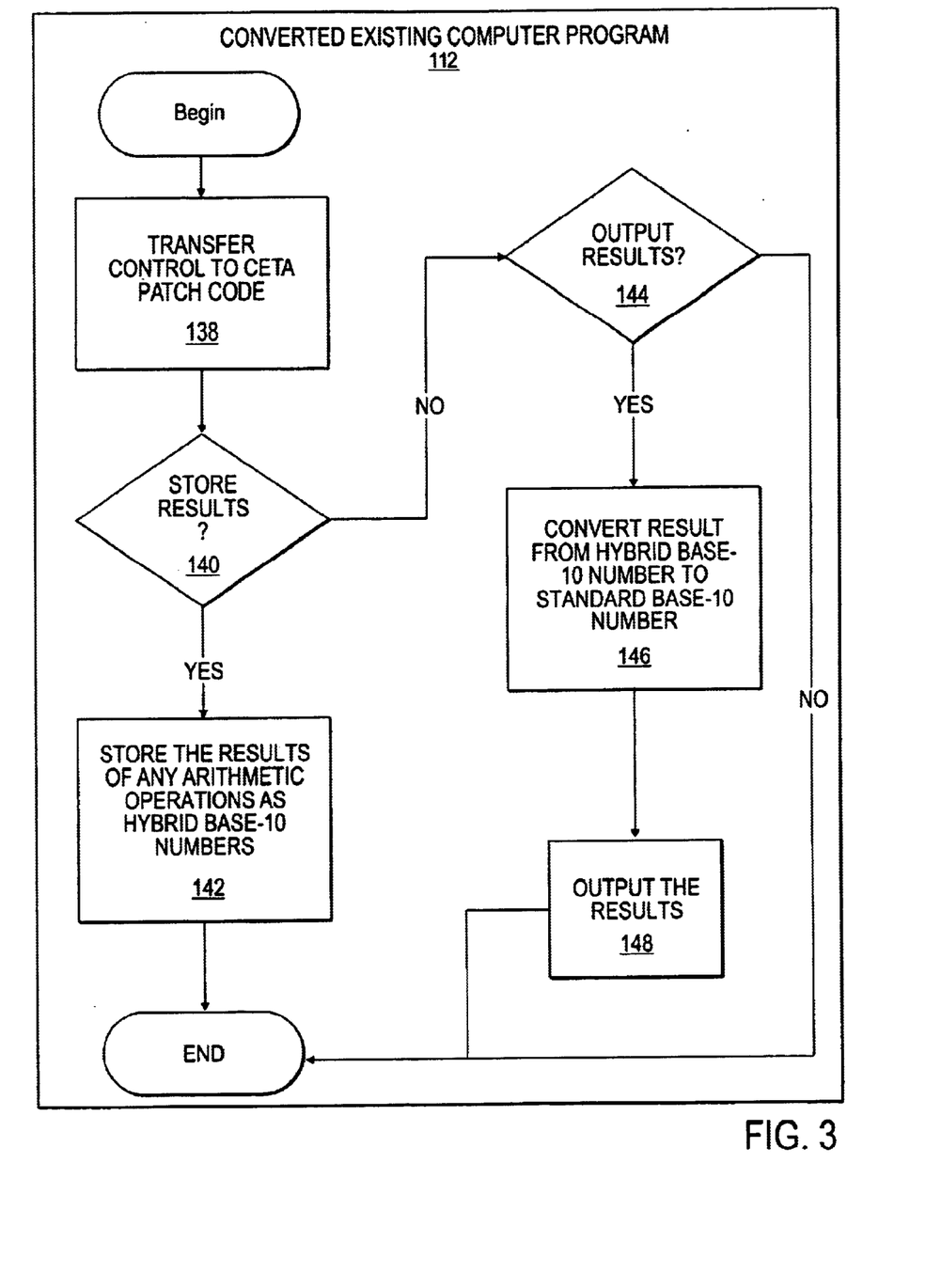
FIG. 3 is a flowchart illustrating aspects of an exemplary computer program, for processing two-digit year dates from 1900 to 2065, according to one embodiment of the present invention.

At step 138, as each transfer of control instruction (see step 184, FIG. 2) is encountered during the execution of computer program 112, program execution will WF jump to a one or more CETA patch programs 118, wherein are implemented, using the hybrid base-ten number system arithmetic of the present invention, one or more particular arithmetic operations or function calls that replace the instruction that is bypassed by the transfer of control instruction (step 184). An exemplary set of procedures of such a CETA patch program is described in greater detail below in reference to FIG. 4.

Step 140 determines if the result of the arithmetic operation or function call is to be stored into, for example, a memory 106 (see FIG. 1) or a database record 120. If so, at step 142, the result is stored as a WF hybrid base-ten number, wherein any two-digit year date represented therein, can indicate a year date from year date 1900 to year date 2065.

At step 144, having determined not to store the result of any arithmetic operation (step 140), the computer program 114 determines if the result is to be output, for example, to a display device 126 (see FIG. 1) or a printer (not shown). If so, at step 146, the computer program 114 converts the result from a WF hybrid base-ten number to a conventional base-ten number. Such a conversion procedure 144 is described in greater detail below in reference to FIG. 6.

At step 148, the converted two-digit year date (step 144) is output, for example, to a display device 126 (see FIG. 1), or a printer (not shown).

E. CETA Patch Program 118

Figure 4:
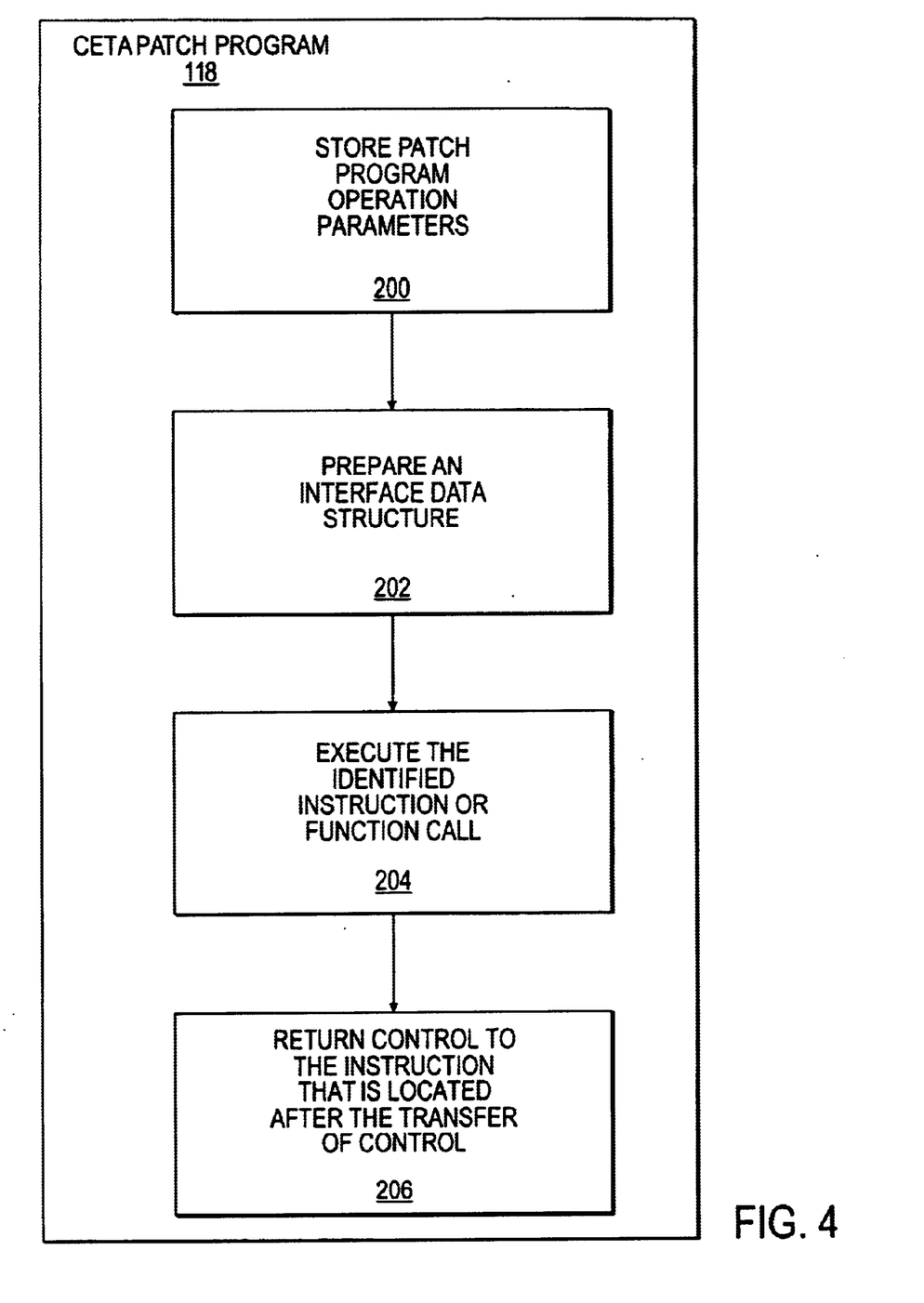
FIG. 4 is a block diagram illustrating aspects of an exemplary CETA patch program, for executing one or more arithmetic instructions or function calls using the hybrid base-ten number systems of the present invention, according to one embodiment of the present invention.

Referring to FIG. 4, there is shown a block diagram illustrating aspects of an exemplary CETA patch program 118 according to one embodiment of the present invention. The present invention uses one or more CETA patch programs 118, where each respective patch program 118 includes logic for performing one or more of: (a) implementing a particular decimal arithmetic operation using the WF number system and associated WF arithmetic to carry out the equivalent WF arithmetic operation and (b) expanding the range of decimal numbers of any length, such that any two-digit year dates can extend beyond year date 1999; and (c) returning a WF number from a function call to a system or current date generator. Now described are a set of exemplary CETA patch program 118 steps.

Step 200 stores patch program 118 operational parameters into a plurality of hardware registers (individual registers are not shown). Such operational parameters include, for example, the opcode of the identified instruction or function call (see step 182, FIG. 2), and a return address to an instruction or function call that is located immediately after the code section associated with the identified instruction or function call. (Recall that this code section was branched by the replacement of such an instruction or function call with a transfer of control instruction, as illustrated at step 184 in FIG. 2).

Figure 5:
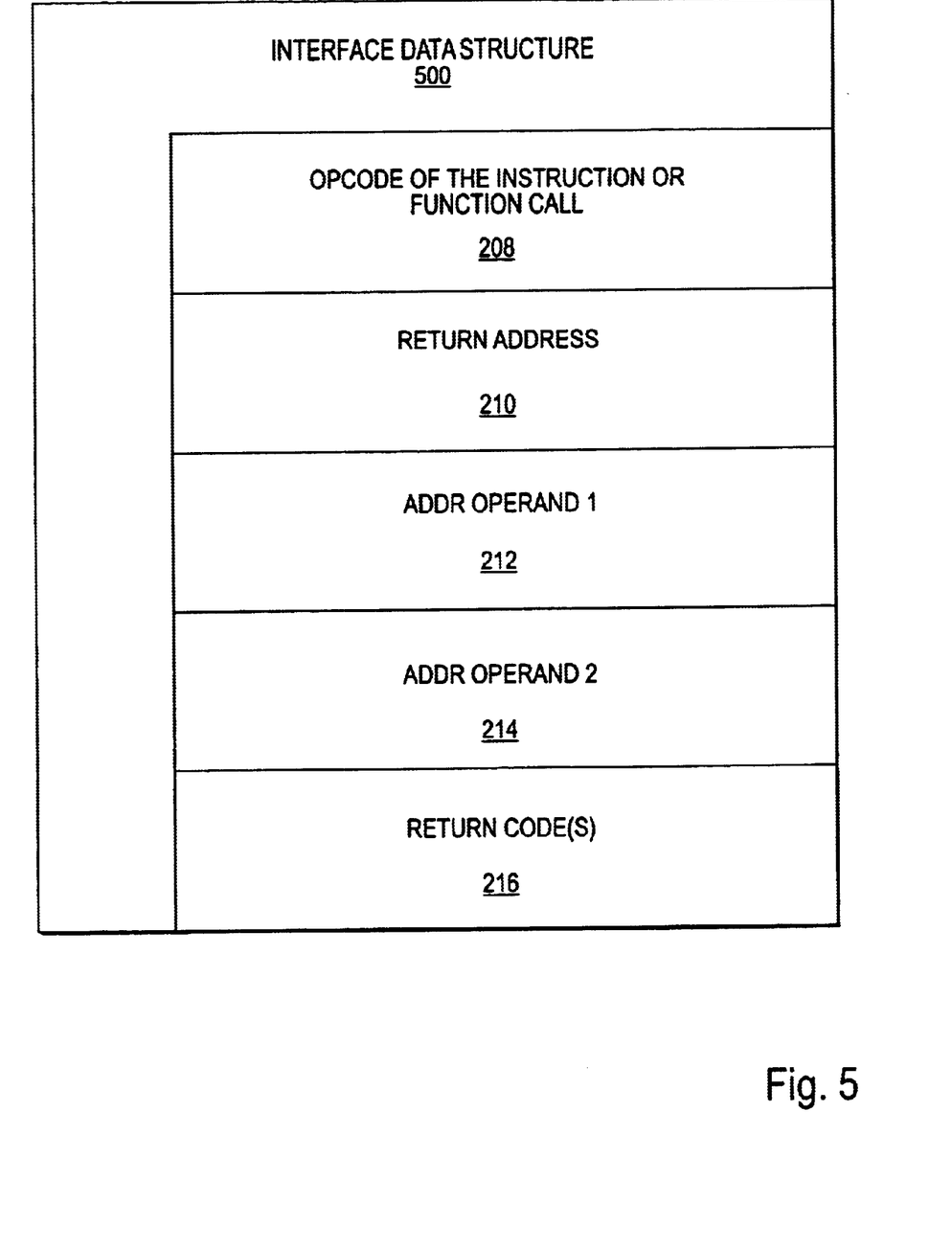
FIG. 5 is a block diagram illustrating aspects of an exemplary interface data structure, according to one embodiment of the present invention; and, FIG. 6 is a flowchart illustrating aspects of an exemplary CETA procedure, for enabling a computer program to process two-digit year dates from 1900 to 2054, and to process two-digit year dates that are numerically equivalent to special codes used in an existing computer program according to one embodiment of the present invention.

Step 202 prepares an interface data structure for use, by the CETA patch program 118, while performing WF arithmetic operations. Referring to FIG. 5, there is shown a block diagram of an exemplary interface data structure 500, according to one embodiment of the present invention. The opcode of the identified instruction or function call 208 (see step 182 as illustrated in FIG. 2) is stored so that it can be referenced, by CETA patch program 118, as necessary. The respective 210 of the first operand 212 and the second operand 214 are stored. Return code(s) 216 is used to store any arithmetic instruction return codes, such as, for example, a data overflow exception indication, and an indication of whether a result is positive or negative numerical value. Such a return code 216 may be returned to the converted computer program 114 upon completion of the CETA patch program 118.

Referring to step 204 in FIG. 4, step 204 executes the identified instruction or function call. If executing an arithmetic instruction, step 204 uses WF arithmetic as described in greater detail below. If executing a function call to a system or current date generator, the respective function call is performed and the result of the function call is converted into WF number year date before the converted result is returned to the converted computer program 114.

Step 206 returns program execution control to the instruction or function call located at the return address stored at step 200.

F. WF Arithmetic

ADDITION: The addition of two base-ten WF 16 numbers of any length is accomplished in a fashion similar to the addition of decimal numbers. (The rules given below for the WF16 system are easily modified for any of the lower rank base-ten WF number systems). However, a simple rule is used to resolve the redundancy in the WF number system. The rule is: The highest digit that can be used in the WF system is retained in each digit position of the sum. This is called the rhd rule for "retain highest digit."

A simple example will help to clarify the formal addition rules given later. This example uses the rhd rule. Two decimal numbers which could contain two-digit year dates are added to form a WF number sum:

47035164+82057397=C908C4FB (129092561 decimal)

Notice that the sum of the first digits, 4 and 7=11, could have produced a sum digit of 1 with a carry of 10 to the next digit position or a sum digit of B=11 with no carry. The B=11 with no carry is chosen by the above rule.

The "retain highest digit" rule in WF arithmetic is desirable for solving Y2K problems in computer programs. It guarantees that the WF sum digits formed from any two adjoining digit positions in two decimal or WF numbers of any length will always retain the maximum numerical range of two WF digits without a carry into the third digit position. There will be no carry out of these two digits until the maximum range is exceeded. In the example above, notice that the sum of the first two digits of the numbers: 97+64= 161. The sum of these two digit positions in the WF sum is FB=161 decimal. Hence, two-digit decimal year date information is not lost because of any addition to a year date until the maximum range of two digits in the WF sum is exceeded—no matter where the original two-digit decimal year date is stored or embedded in larger integers such a credit card numbers, inventory numbers, etc.

Formal Addition Rules are now described. Consider two WF integers X and Y of length n digits. Let S=the sum of X+Y. The numbers X, Y and S can be represented as:

X=h(n−1)h(n−2) . . . h(0);

Y=k(n−1)k(n−2) . . . k(0); and,

S=s(n−1)s(n−2) . . . s(0).

The digits of X are h(i), the digits of Y are k(i), and the digits of S are s(i), where 0<=i<=n−1. Keep in mind that in the WF16 number system the digits h, k, and s can be any one of sixteen values from 0 to f=15. During the addition of X+Y, let the carry into a digit position (i) be c(i) and the carry generated into the next digit position be c(i+1). At each digit position let t(i)=h(i)+k(i)=c(i). That is, at each digit position i, t(i) is equal to the sum of the two digits h+k plus the carry propagated into this digit position.

Now, the value of the sum digit s(i) at any position (i) is determined as follows:

when t(i)<16, s(i)=t(i) and the carry propagated is c(i+1)=0;

when 15<t(i)<26, s(i)=t(i)−10 and c(i+1)=1; and, when 25<t(i)<32, s(i)=t(i)−20 and c(i+1)=2.

Now move to the i+1 digit position by setting i=i+1 and the new c(i) equal to the previous c(i+1) calculated generated above. Stop when i=(n−1).

The rules above for determining the sum digits s(i) in the sum of two W16 numbers use the rule "retain highest digit" (rhd) possible (0 through f) in each digit position when forming the sum of two WF numbers. This also means propagating the number of carries of ten to the next highest digit position. Other rules are possible which leave less than the highest digit in each sum digit position. For instance, when the sum of two digits plus the carry is between 20 and 29, we could retain a sum digit of 0 to 9 with a carry of 2 propagated into the next digit. This is a "retain lower digit" (rld) rule.

It can be seen that either of these two rules can be used at any digit position to give a variety of sums. All redundant sums so formed are numerically equivalent in the WF number system. But all rules for addition other than the "retain highest digit" above can lose information in Y2K applications that process two-digit WF numbers that represent year dates, as will be shown below.

SUBTRACTION: Assume that X is greater than or equal to Y. Let the difference X−Y=D. We can represent the difference D as D=d(n−1)d(n−2) . . . d(0). Let the borrow into a digit position (i) be b(i) and the borrow from the next highest digit position be b(i+1). Let t(i)=h(i)−k(i)−b(i) at each digit position (i).

Now, the value of the difference digit d(i) at any position (i) is determined as follows:
- when t(i) >=0 (greater than or equal to 0), then d(i)=t(i) and b(i+1)=0;
- when t(i) <0, let x=−t(i). That is, let x equal the absolute value of the negative t(i);
- when 0<x<11, d(i)=10−x and b(i+1)=1 (borrow 10); and,
- when 10<x<17, d(i)=20−x and b(i+1)=2 (borrow 20).

Now move to the next higher digit position by setting b(i) to the b(i+1) generated above.

The above procedure also uses the rule retain the highest digit (rhd) in each digit position of the difference D.

MULTIPLY AND DIVIDE: To perform a multiply or divide arithmetic operation, the two operand WF numbers are first converted to normal decimal numbers and a normal decimal arithmetic operation is performed. However, repeated WF additions or WF subtractions can be performed to produce results as WF numbers.

Other WF Addition Rules:

From the above rules for performing W16 arithmetic using the "retain highest digit" rule it can be appreciated that other rules for recording the sum digit s(i) and carry out of any digit position can be used the sum digit s(i) can be as high as 33 when the two digits being added are f=15 and f=15 and the carry into this digit position is a 3. For example, consider the addition of the WF numbers fff and fff. The sum of the first digits is 30. This could be recorded as s(0)=0 with a carry of 3 to the next higher digit position. Using this "retain lowest digit" rule, the sum of the next two digits will be f=15 plus f=15 plus a carry of 3 which equals 33. A sum digit of 3 can be retained with a carry of 3. This "retain lowest digit" rule produces results that are conventional decimal numbers because the maximum number of carries out of each digit position are always generated and none of the digits a, b, c, d, e, or f are retained in the sum. This is one way to convert any WF number back to a pure decimal number by adding all zeros to it when the WF arithmetic logic is set to use the "retain lowest digit" rule.

Another additional rule that is useful for other applications of WF numbers is to use an "in between" rule whereby a digit a, b, c, d, e, or f is retained as the sum digit s(i) only when the sum plus the carry at this digit position is between 0 and f=15. In all other cases, the maximum carry of tens to the next higher digit position is generated and the sum digit s(i) is always recorded as a decimal digit 0 through 9. Or the rule can be "retain highest digit" when the sum at any digit position is between 0 and 15 or between 20 and 25 but not when the sum is between 30 and 33.

Any of the several possible "carry propagation" rules as shown above for the addition of two decimal and/or WF numbers using WF arithmetic can be used interchangeably at each digit position in the sum of the two numbers. All results produced will be numerically equivalent numbers. By this manner, all possible redundant WF numbers representing a given numerical quantity can be generated.

This feature of WF arithmetic has value for secure data transmission and data encryption applications and expansion of decimal numbers in general.

COMPARE OPERATIONS: For a compare decimal arithmetic operation, the two operand WF numbers are converted to normal decimal numbers before the comparison is performed.

CONVERT WF TO DECIMAL: Starting at the lowest-order digit position (n=0) in an n-digit WF number: if the digit d is greater than 9 then subtract 10 from the digit and replace the digit with the difference (d−10) and carry a 1 to the next higher digit position, n=1. Repeat this operation to the highest-order digit position (n−1) in the WF number.

If a carry into the (n−1) digit position results in a sum greater than 9 then this sum is decreased by 10 and a 1 is carried to the n digit position which results in decimal number n+1 digits long with a high-order digit of 1. For example, four-digit 5b6c WF goes to four-digit 6172 decimal, but four-digit 9b6c WF goes to five-digit 10172 decimal.

WF arithmetic sets an optional "decimal overflow flag" whenever it computes a result as an n-digit WF number that would overflow to n+1 digits if the computation had been done in decimal.

SHIFT AND ROUND DECIMAL OPERATIONS: For shift and round decimal instruction, a WF number is converted to decimal and then the respective instruction is executed normally by the system.

With respect to an WF arithmetic operation, before exiting any WF arithmetic routine, any WF special codes are reinserted and the result placed in memory 106 (FIG. 1). For example, 20 is converted to 2f where a YYYY date field with a 2f special code was detected in one or both operands. If 99 is a special code, 99 is converted to 9f, and if 00 is a special code, 00 is converted to ff. Special codes are described in greater detail below in reference to FIG. 6.

G. Structural Level Description

The apparatus of the present invention includes a processor with a memory that is either internal or external to the processor for executing the procedures of the present invention. For example, such a processor can be processor 102 (see FIG. 1) and such a memory can be RAM memory 106. The procedures of the present invention are discussed in greater detail above in reference to FIGS. 2–6.

H. Computer Program Product

The methods of the present invention, as described in greater detail above in reference to FIGS. 2–6 are amenable for execution on various types of executable mediums other than a memory device such as a random access memory. Other types of executable mediums can be used, such as but not limited to, a computer readable storage medium which can be any memory device, compact disc, or floppy disk.

I. Alternative Embodiments

SPECIAL CODES: A significant problem with the state of the art is that many existing computer programs that use some two-digit decimal year dates as special codes do not correctly process two-digit year dates that are generated by WF arithmetic which years dates are the same as the special codes A truncated WF number system, WF15, that uses a flag digit provides a solution to this significant problem.

Figure 6:
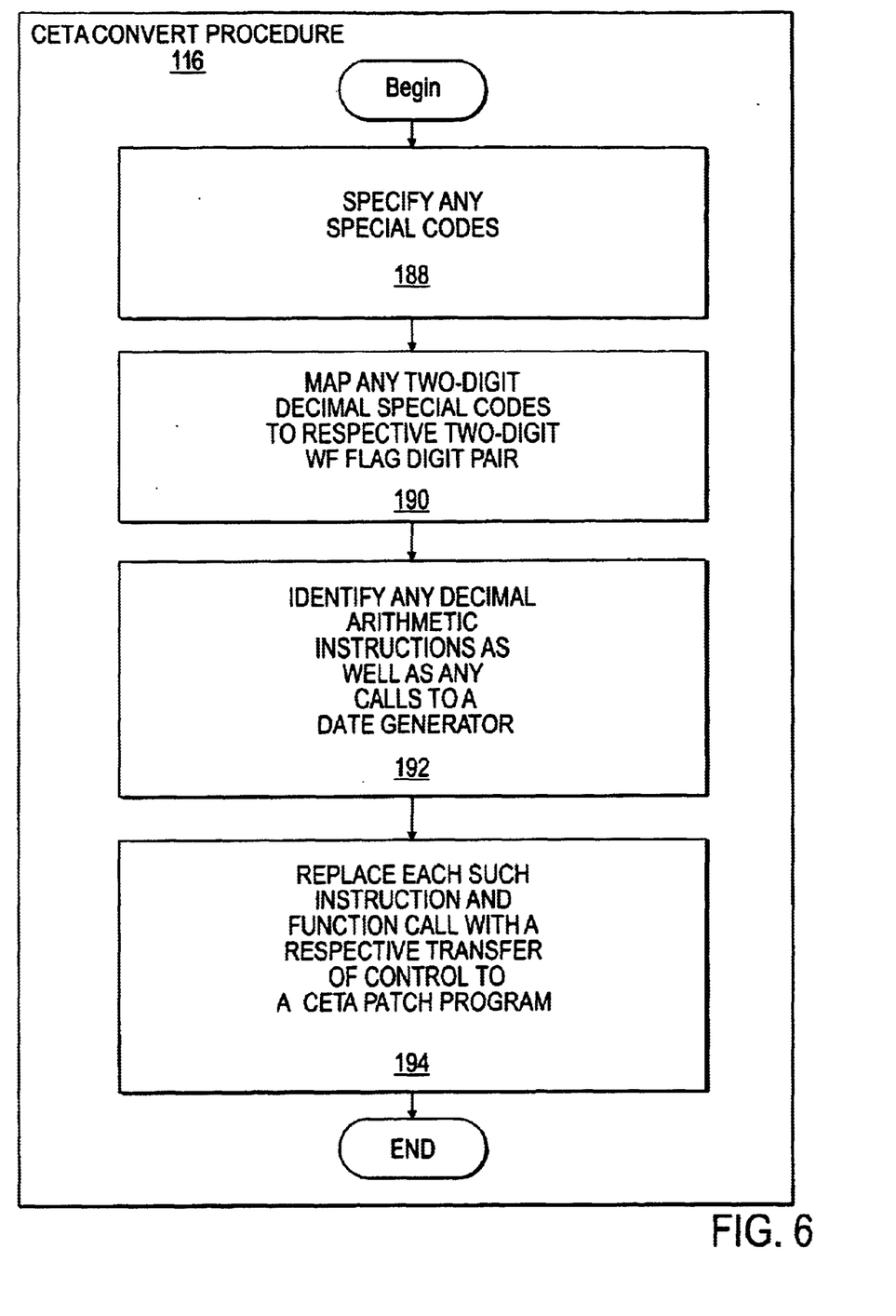

Referring to FIG. 6, there is shown a flowchart illustrating aspects of an exemplary CETA 116 procedure, according to one embodiment of the present invention.

In this embodiment, The symbol "f" is used as a flag digit in the WF15 number system. The flag digit "f" in a WF number does not have a numerical value as a multiplier of a power. often. The flag "f" in any digit position (i) in a WF number specifies a special case in which the "f" digit at position d(i) and the next highest digit d(i+1) form a flag digit pair d(i)d(i+1). In the WF15 number system that uses the "f" flag digit, there can be sixteen flag digit pairs: 0f, 1f, 2f, 3f, 4f, 5f, 6f, 7f, 8f, 9f, af, bf, cf, df, ef, and ff.

Each flag digit pair can be given a numerical value or a non-numerical meaning in the WF15 number system. For example, the special code 9f may be used to represent (stand in for) the numerical digits 99 in a WF integer. This feature is extremely important for solving the Y2K problem in many existing computer programs that use, say, the two-digit decimal year date combination "99" to mean something other than the year date 1999 (for instance, 99 means "no year date available" or "end of file"). The steps of this embodiment are now described.

At step 188, any special codes used by the pre-converted program are specified. In one embodiment, to specify any special codes (step 188), CETA 116 may query a human computer operator via a user interface 124 (see FIG. 1) to input any such special codes. As discussed in greater detail above, such special codes may be, for example, "00" or "99". It can be appreciated that special codes could also be read, for example, from a data file.

At step 190, each specified special code year date between 00 and 99 used in the existing computer program is mapped (assigned) to an "f" flag digit pair in the WF15 number system. This WF flag pair is given a logical or numerical value to be used by WF15 arithmetic whenever this flag pair is encountered by itself or embedded in another WF number. In numerous cases the WF15 flag pair "9f" has been assigned to the special code 99 and the flag pair "ff" to the special code 00. The two-digit decimal year date special codes 00 and 99 are the most common ones reserved for special meanings in old programs. This was done because "9f" collates between 98 and 99 and "ff" collates after 99, as is explained below.

At step 192, the machine code or source code of computer program 114 is scanned for each occurrence of a decimal arithmetic instruction and for each occurrence of a function call to a system or current date generator function (not shown).

Step 194 replaces all such identified instructions and all such identified function calls with a transfer of control to an associated CETA patch program 118 (see FIG. 1). As noted above, such transfers of control are known in the art.

In this manner, when executing the CETA converted computer program 114, if a two-digit year date was mapped (step 190) to a specified flag pair (step 188), the CETA patch program 118 will return a result to the computer program 114, wherein the result is equal to the flag pair that had been mapped to the two-digit year date special code (step 190). For example, if the identified function call (step 192) returns a current date with a year date of "99", and if flag number "9f" had been mapped to year date special code 99 (step 190), the patch program 118 will return the flag pair "9f" to the computer program 114.

This means that a substitute code, 9f, for the actual year date 99 will be generated and stored henceforth in databases without using the special year date (SYD)=99 which the existing program logic interprets to mean something else. However, "9f" is interpreted by WF arithmetic as the numerical value 99 whenever the special code pair 9f is encountered in a WF number.

Henceforth, the actual year date 1999 can be represented, generated, stored, and processed as "9f" by the WF arithmetic in the CETA converted program without conflict with the existing program logic that interprets the numbers 99 to be "end of file." Only the WF arithmetic logic inserted into the CETA converted program ever allows the actual numerical value 99 to be used in place of "9f." Whenever WF arithmetic produces a two-digit result equal to 99 that could be an actual year date, the 99 is replaced by "9F" before it is returned to program 114. In this, manner, only the old program logic will ever generate "99" as a year date to mean "end of file" and then store it in database files. The program logic will never encounter 99 as a year date that has been generated by the modified CDG or WF arithmetic.

WF15 Special Code "9f" for 99 Collates Properly:

In the WF15 number system, the flag digit pair "9f" was selected for representing the year date 99 for a very good reason. Any one of the other sixteen "f" flag digit pairs could have been used. It is a unique feature of this invention that WF15 "9f" represented as a binary number properly collates between the actual year dates 98 and 100. This means that year dates stored as 9f will still collate exactly like 99. This is extremely important.

TELEPHONE NUMBERS: The present telephone dial pad has 12 buttons which produce 12 different signals recognized by telephone switching equipment. These include 0, 1, 2, 3, 4, 5, 6, 7, 8, 9, * and #. The * and # digits can be used in abase-ten WF12 number system. Using * and # expands the number of seven digit telephone numbers to all the extra unique combinations. Using the * and # digits in a base-ten WF12 numbering scheme provides several million more usable telephone numbers in each area code than can be expressed in a typical seven digit decimal telephone number.

SOCIAL SECURITY NUMBERS: The nine digit Social Security identification numbers can be expanded by the hybrid number system of the present invention. For example, writing a Social Security using base-ten WF16, provides an additional 666,666,666 combinations of nine digits than is possible with normal decimal digits. Using just a WF11 number system that uses only one extra digit a=10 can expand available Social Security numbers by 111,111,111 combinations. Using the digit "a" in only the high-order digit position provides 100,000,000 more combinations.

The WF11 number system can be used to expand the available seven-digit local telephone numbers in the U.S. All touch tone telephone dials include the symbols * and # which produce unique tones (codes transmitted to the telephone switching computers). These two symbols can be used like the digits "a" and "b" in a WF11 hybrid number system to expand the range of seven-digit local telephone numbers. Using just one symbol, say, # as a WF11 digit in telephine numbers would add an extra 1,111,111 available numbers in each area code. Using both # and * would add an extra 2,222,222 numbers. These WF11 numbers are easily processed by all modern telephone switching computers since the # an * digits are coded in four-bit patterns just like the ten decimal digits.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. In a computer system, a method of expanding the numerical range of decimal numbers of any length in the machine code of an existing computer program in the computer system by using a hybrid base-ten number system, the method comprising the steps of:

representing a conventional base-ten two-digit year date $X_1X_2$ as a hybrid base-ten two-digit year date $Y_1Y_2$ such that each digit $Y_1$ and $Y_2$ is selected from a group of digits including 0, 1, 2, 3, 4, 5, 6, 7, 8, 9, a, b, c, d, e and f, wherein "a" represents a value of decimal 10, "b" represents a value of decimal 11, "c" represents a value of decimal 12, "d" represents a value of decimal 13, and "e" represents a value of decimal 14, any digit 0, 1, 2, 3, 4, 5, 6, 7, 8, 9, a, b, c, d and e in the two-digit year date $Y_1Y_2$ being a multiplier of ten and any digit "f" in the two-digit year date $Y_1Y_2$ representing a flag digit;

specifying a predetermined flag digit pair that includes the flag digit and represents a first year date;

mapping the first year date to the flag digit pair, the flag digit indicating to an arithmetic operation that the flag digit pair represents the first year date;

replacing in the machine code of the existing computer program each call to a date generator with a transfer of control to a patch program for representing the mapped year date as the flag digit pair and thus providing a converted computer program;

executing the converted computer program so as to call the date generator to obtain a date and, if the date includes a second year date that is numerically equivalent to the first year date, returning the flag digit pair to the existing computer program whereby the flag digit pair is interpreted as the first year date and processed using the hybrid base-ten number system.

2. A computer readable storage medium containing an instruction program for use with a computer program of a computer, the instruction program written to perform the steps of:

representing a conventional base-ten two-digit year date $X_1X_2$ in the computer program as a hybrid base-ten two-digit year date $Y_1Y_2$ each year date digit $Y_1$ and $Y_2$ being selected from a group of digits including 0, 1, 2, 3, 4, 5, 6, 7, 8, 9, a, b, c, d, e and f, wherein "a" represents a value of decimal 10, "b" represents a value of decimal 11, "c" represents a value of decimal 12, "d" represents a value of decimal 13 and "e" represents a value of decimal 14, any digit 0, 1, 2, 3, 4, 5, 6, 7, 8, 9, a, b, c, d and e in the two-digit year date Y Y2 being a multiplier often and any digit "f" in the two-digit year date $Y_1Y_2$ representing a flag digit;

specifying a flag number that includes a flag digit and has an equivalent numerical value to a first year date;

mapping the first year date to the flag number, the flag digit indicating to an arithmetic operation that the flag number is numerically equivalent to the first year date;

replacing in the computer program each call to a date generator with a transfer of control to a patch program for at least representing the mapped year date as the flag number and thus providing a converted computer program; and, executing the converted computer program so as to call the date generator to obtain a date and, if the date includes a second year date that is numerically equivalent to the first year date, returning the flag number to the existing computer program whereby the flag number is interpreted as the first year date and processed using the hybrid base-ten number system.

3. In a computer system, a method of expanding the numerical range of decimal numbers of any length utilized in the computer system by using a hybrid base-ten number system, the method comprising the steps of:

representing a conventional base-ten number $X_n, \ldots X_1$ of n digits, where n is greater than or equal to one, as a hybrid base-ten number $Y_m \ldots Y_1$, of m digits, where m is less than or equal to n, such that each digit of the hybrid base-ten number is selected from a group of digits including 0, 1, 2, 3, 4, 5, 6, 7, 8, 9, a, b, c, d, e and f, wherein "a" represents a value of decimal 10, "b" represents a value of decimal 11, "c" represents a value of decimal 12, "d" represents a value of decimal 13, and "e" represents a value of decimal 14, any digit 0, 1, 2, 3, 4, 5, 6, 7, 8, 9, a, b, c, d and e of the hybrid base-ten number being a multiplier of ten and any digit "f" of the hybrid base-ten number representing a flag digit;

specifying a predetermined flag digit identifier that includes the flag digit "f" and represents a numerical value;

mapping the numerical value whenever it appears in a hybrid base-ten number resulting from an arithmetic operation in the computer system to its corresponding flag digit identifier, the flag digit indicating to subsequent arithmetic operations in the computer program that the flag digit identifier embedded in the hybrid base-ten number represents the numerical value.

4. The method of claim 3 further comprising the steps of replacing in the computer system all decimal arithmetic operations with a hybrid base-ten arithmetic operation in which each reference to the flag digit identifier found in a hybrid base-ten number is replaced with the numerical value to provide a converted number of the hybrid base-ten number system and utilizing one of the "retain highest hexidecimal digit rule", "retain up to specified hexidecimal digit rule" or "retain lowest digit rule" in each digit of the converted number to produce a numerical result wherein the "retain highest hexidecimal digit rule" produces a hybrid base-ten number with the highest numerical range for a given number of digit positions, the "retain up to specified hexidecimal digit rule" produces a hybrid base-ten number of intermediate range in which hexidecimal digits above a specified hexidecimal digit are not used and the "retain lowest digit rule" produces pure decimal numbers.

5. The method of claim 3 further comprising the steps of replacing in the computer system each instruction that performs a decimal arithmetic operation on a decimal number with a transfer of control to a patch program which replaces each flag digit identifier of the hybrid base-ten number with its numerical value to provide a converted number of the hybrid base-ten number system and performs a hybrid base-ten arithmetic operation on the converted number to produce a numerical result as a hybrid base-ten number so as to provide a converted computer system.

6. The method of claim 3 wherein a nested set of upwardly compatible hybrid base-ten number systems are utilized.

7. A computer readable storage medium containing an instruction program for use with a computer system to expand the numerical range of decimal numbers of any length utilized in the computer system by using a hybrid base-ten number system, the instruction program comprising the steps of:

representing a conventional base-ten number Xn . . . X1 of n digits, where n is greater than or equal to one, as a hybrid base-ten number Ym . . . Y1 of m digits, where m is less than or equal to n, such that each digit of the hybrid base-ten number is selected from a group of digits including 0, 1, 2, 3, 4, 5, 6, 7, 8, 9, a, b, c, d, e and f, wherein "a" represents a value of decimal 10, "b" represents a value of decimal 11, "c" represents a value of decimal 12, "d" represents a value of decimal 13, and "e" represents a value of decimal 14, any digit 0, 1, 2, 3, 4, 5, 6, 7, 8, 9, a, b, c, d and e of the hybrid base-ten number being a multiplier of ten and any digit "f" of the hybrid base-ten number representing a flag digit;

specifying a predetermined flag digit identifier that includes the flag digit "f" and represents a numerical value;

mapping the numerical value whenever it appears in a hybrid base-ten number resulting from an arithmetic operation in the computer system to its corresponding flag digit identifier, the flag digit indicating to subsequent arithmetic operations in the computer program that the flag digit identifier embedded in the hybrid base-ten number represents the numerical value.

* * * * *